March 24, 1959 J. GREEN 2,879,245
REACTION PRODUCT OF SULFUR VULCANIZED RUBBER POLYMER
AND A MATERIAL HAVING CARBON TO CARBON UNSATURATION
ALPHA TO AN ELECTRON ACCEPTOR GROUP
Filed Feb. 24, 1955 2 Sheets-Sheet 1

TORSIONAL HYSTERESIS vs. CONCENTRATION

MOONEY ML/2l2/1-5 (6 DAYS) vs. CONCENTRATION

PROCESSING FACTOR (6 DAYS) vs. CONCENTRATION.

INVENTOR
JOSEPH GREEN
BY Robert Irving Williams
ATTORNEY

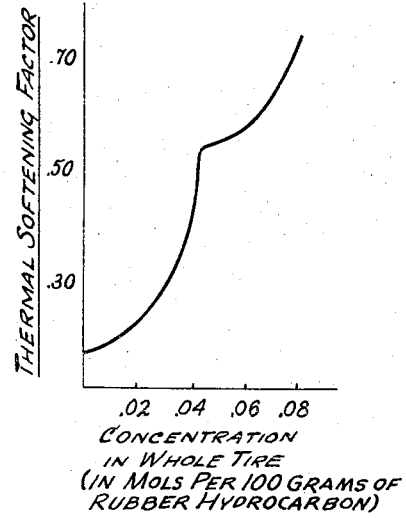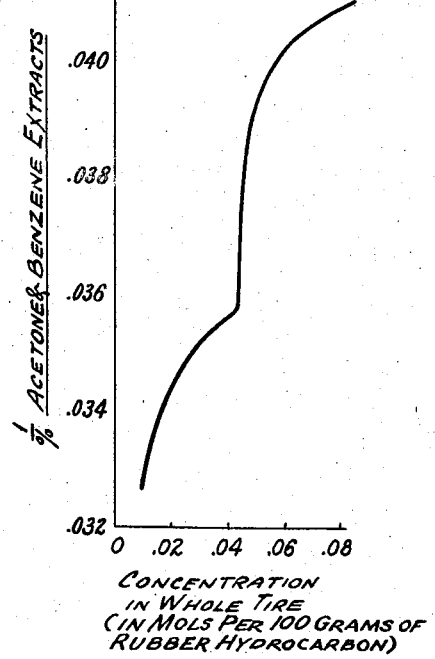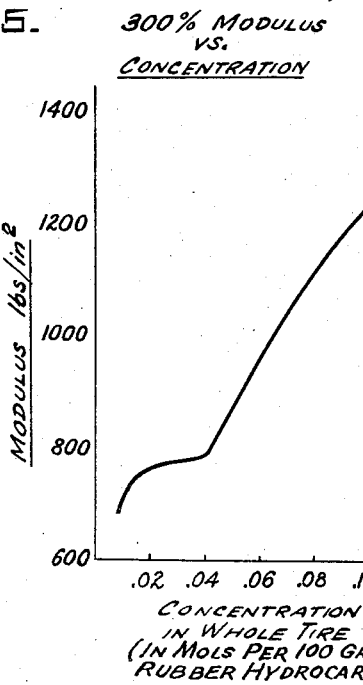

United States Patent Office 2,879,245
Patented Mar. 24, 1959

2,879,245

REACTION PRODUCT OF SULFUR VULCANIZED RUBBER POLYMER AND A MATERIAL HAVING CARBON TO CARBON UNSATURATION ALPHA TO AN ELECTRON ACCEPTOR GROUP

Joseph Green, Buffalo, N.Y., assignor to U. S. Rubber Reclaiming Co., Inc., Buffalo, N.Y., a corporation of New York Application February 24, 1955, Serial No. 490,356

14 Claims. (Cl. 260—33.6)

This invention relates to polymeric materials, and more particularly to copolymers formed from vulcanized rubbery hydrocarbon material with unsaturated substances, such as maleic anhydride.

This is a continuation-in-part of my copending application Serial No. 382,598 filed September 25, 1953.

It has been known that maleic acid (here, and elsewhere where the context so requires, the term "acid" is to be understood to include acid anhydrides) and similar substances serve as rubber reclaiming agents when used in proportions usual for reclaiming agents. For example, 1% or 1½% of maleic anhydride is effective as a reclaiming agent. I have found, however, that when the quantities of substances containing a double bond alpha to an electron-acceptor (electrophilic) group are increased beyond a critical proportion, a new phenomenon occurs and a new product is formed. Why such a change should take place when the proportion of the unsaturated substance is increased beyond a critical point is not fully understood, but a marked change in the following properties does occur:

Torsional hysteresis,
Mooney viscosity,
Processing factor (the difference in Mooney viscosity with time, expressed by subtracting the ML/212/6–1 value from the ML/212/0–1 value and dividing by 6, where "ML" indicates a large-rotor Mooney machine, "212" the temperature of the test in degrees Fahrenheit, "6" or "0" the time in minutes during which the machine is in operation, and "1" the warming-up time in minutes before the machine is started),
Rehardening,
Tensile strength,
Thermal softening factor (the difference in Mooney viscosity with temperature, expressed by the difference between the ML/180/6–1 value and the ML/212/6–1 divided by 32),
300% modulus,
Acetone extract,
Benzal extract, and changes in other qualities.

Such changes in certain of these properties are illustrated in the drawings.

This change in properties enables scrap rubbery hydrocarbon polymers to be converted into materials having uses for which ordinary reclaims cannot be employed as effectively, if at all. These substances, indeed, have certain properties which even the ordinary vulcanized rubbers do not possess. Among their other qualities are an ability to be combined with substantial proportions of oil to give so-called "oil-extended" rubbers, and an ability to provide an oil-resistance like that of acrylonitrile copolymers or neoprene (tested by methods set forth in pages 949 thru 954 of the 1949 Book of A.S.T.M. Standards including Tentatives, Part 6, published by the American Society for Testing Materials, Philadephia, Pa., 1950). Highly satisfactory reaction products of reclaimed vulcanized rubbery scrap material and high-Mooney rubbers may likewise be obtained by the use of substances such as contemplated by the invention.

Another advantage of products such as contemplated by the invention is their relative great compatibility with neoprene and acrylonitrile rubbers, which enables the latter to be extended thereby and desired mixtures to be formed.

TABLE I

|  | Ordinary Reclaim | Applicant's Process |
|---|---|---|
| 30-mesh whole tire | 100.0 | 100.0 |
| Petroleum resin | 12.0 | 12.0 |
| Di-xylyl disulfide | 0.3 |  |
| Terpene hydrocarbon | 2.0 |  |
| Maleic anhydride |  | 4.0 |
| Amps | 15.3 | 12.2 |
| Rate | 56 | 44 |
| ML/212/1-3 | 27 | 75 |
| ML/212/1-5 | 25 | 67½ |

| Cured RAF—50% | Tensile | Elongation | Hardness | 300% Modulus | Tensile | Elongation | Hardness | 300% Modulus |
|---|---|---|---|---|---|---|---|---|
| 30/40 | 785 | 395 | 42 | 570 | 1,245 | 390 | 60 | 1,055 |
| 40/40 | 835 | 390 | 43 | 605 | 1,310 | 370 | 61 | 1,135 |
| 50/40 | 860 | 385 | 44 | 655 | 1,265 | 310 | 63 | 1,255 |

CURED IN HARD RUBBER FORMULA

| | | |
|---|---|---|
| Reclaim | 100.0 | 100.0 |
| Paragon Clay | 75.0 | 75.0 |
| Paraflux | 15.0 | 15.0 |
| Sulfur | 22.0 | 22.0 |
| Lime | 10.0 | 10.0 |

|  | 20/40 | 30/40 | 20/40 | 30/40 |
|---|---|---|---|---|
| Shore D Hardness | 85 | 87 | 86 | 88 |
| Impact | 14 | 13 | 25 | 11 |
| Elongation | 2.2 | 1.2 | 3.3 | 1.8 |
| Tensile | 2,580 | 2,953 | 3,140 | 3,777 |

The products of the present invention are also especially well adapted for the formation of hard rubber products. Their advantages in this respect are indicated in the above table, which compared the products of the two formulas given when reclaimed by the method and apparatus of U.S. Patent No. 2,653,348 identically for both stocks except for the difference in power input and the rate of production (in pounds of reclaim per hour) as noted.

For a fuller understanding of the nature and objects of the invention, reference should be had to the following detailed description taken in connection with the accompanying drawings, in which:

Fig. 4 is a chart showing a curve of thermal softening factor against concentration of maleic anhydride in whole tire scrap;

Fig. 5 is a chart showing a curve of modulus against concentration of maleic anhydride in whole tire scrap; and Fig. 6 is a chart showing a curve of the reciprocal of the sum of acetone extract and benzol extract against concentration of maleic anhydride in whole tire scrap.

Figure 1:
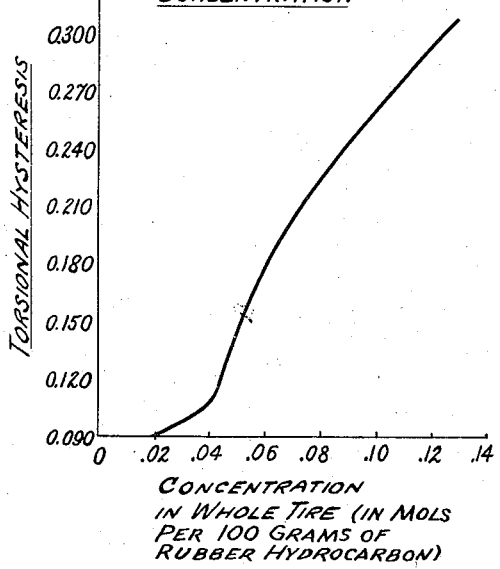
Figure 1 is a chart showing a curve of torsional hysteresis against concentration of maleic anhydride in whole tire scrap.
Figure 2:
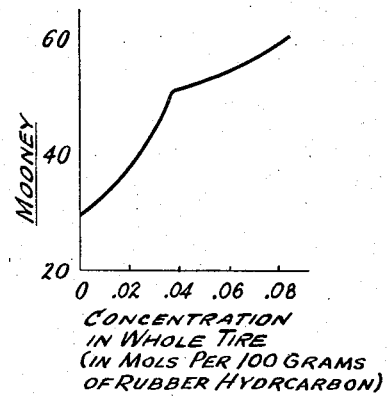
Fig. 2 is a chart showing a curve of Mooney viscosity against concentration of maleic anhydride in whole tire scrap.
Figure 3:
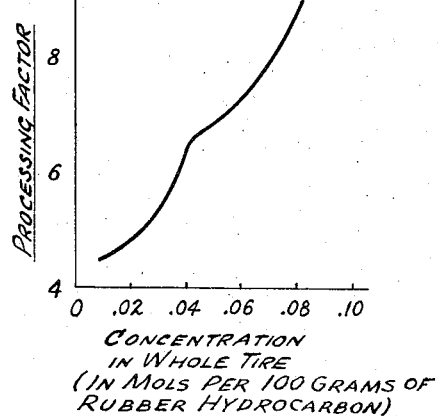
Fig. 3 is a chart showing a curve of processing factor against concentration of maleic anhydride in whole tire scrap.

As shown in Figs. 1–6, the critical changes in direction of the maleic acid curves occur when over 2 parts by weight of maleic anhydride per 100 parts by weight of whole tire scrap—i.e., 0.0204 mol of an unsaturate per 100 grams of whole tire scrap—are used. Since whole tire scrap normally is about 50% "rubber hydrocarbon"— i.e., is formed by compounding about 50% of other materials with the raw rubber hydrocarbon—this will equal 0.0408 mol of an unsaturate to each 100 grams of "rubber hydrocarbon" if the compounding ingredients are ignored. With tube stock, the mols of unsaturate to 100 parts of tube scrap will run 0.03 more or less, depending on the amount of other ingredients compounded with the raw natural or synthetic rubber from which the tubes were made, but the amount required to obtain the results of the present invention will, in any case, be over 0.0408 mol of an unsaturate to each 100 grams of rubber hydrocarbon. Excellent results with maleic anhydride have been obtained where 8 grams of maleic anhydride (0.0816 mol of an unsaturate) are provided for each 100 grams of rubber hydrocarbon. In general, from well over 2 parts up to 25 parts or more of maleic anhydride to each 100 parts of whole tire scrap (from over 0.0408 to 0.510 mol or more of an unsaturate to each 100 grams of rubber hydrocarbon) give effective results.

Instead of maleic acid, there may be used other organic chemicals having an electron-acceptor group such as other carboxylic acids, carbonyl compounds, nitriles, etc., unsaturated in the alpha position relative to the carbon on which the electron-acceptor group is attached. Among the carboxylic acids and anhydrides thereof that may be used are such as maleic (preferably in the form of the anhydride), fumaric, chloromaleic (preferably in the form of the anhyride), citraconic, itaconic, mesaconic, aconitic, sorbic, crotonic, isocrotonic, cinnamic, and, where safety factors are observed, acrylic. Also there may be included in the mix other materials which break down into such unsaturated substances. Among these are citric acid (which on heating gives itaconic anhydride, aconitic acid, citraconic anhydride, and mesaconic acid), malic acid (which at temperatures of 320° F. or more yields maleic and fumaric acids), aconitic acid (which breaks down into itaconic acid), and various hydroxy acids, of which betahydroxypropionic acid (which yields acrylic acid), and betahydroxybutyric acid (which yields crotonic acid) are examples. Proportions of such materials used should be based on the amount of effective unsaturated substance produced therefrom under the conditions of the process.

Among the materials other than acids which may be used are aldehydes, e.g., crotonaldehyde, cinnamaldehyde, and acrolein; ketones, e.g., benzalacetone, mesityl oxide, and phorone; various methacrylates, fumarates, maleates, and other esters of such acids, for example, methyl methacrylate, methyl fumarate, diethyl maleate, dibutyl maleate; and various nitriles, such as acrylonitrile, and butene nitrile where safety factors are observed. Besides chloromaleic acid, a wide number of substituted substances as above indicated may be used, and halo-compounds of various of the above-named acids, such for example as bromomaleic, esters with other acids, ethers, and substances with amino and substituted amino, hydroxyl, amido, and other substituents may be used.

Mixtures of the above substances may be used, and reclaiming agents may be included in the mix.

The temperature of the treatment will be in the range from about 150° F. in a mill up to 500° F. or more (as measured in the chamber wall) in a plasticator or a Banbury. Using the machine of the Elgin et al. U.S. Patent No. 2,653,348, temperatures of 300° F. to 500° F. are desirable, with best results when the processing temperatures are from 325° F. to 425° F. Of course, when the substance is one, like citric acid, which produces the active reagent by decomposition, the temperature will be high enough to effect such decomposition. Temperatures high enough to cause incipient decomposition of the rubber, should, of course, be avoided.

While there are given below certain specific examples of this invention and its application in practical use and also certain modifications and alternatives, it should be understood that these are not intended to be exhaustive or to be limiting to the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

In the following examples, except where otherwise indicated, the reclaiming operations were carried out in the machine like that of said patent operating with a worm speed of 60 r.p.m., an oil temperature of about 310° F., a processing temperature of about 350° F. as externally measured, and a rate of about 50 pounds an hour. The oil temperature is measured in a pipe corresponding to that numbered 16 in said patent and the processing temperature is taken on a thermometer sunk in the casing between chambers corresponding to those numbered 11 and 12 in said patent. The machine was operated on 440 volts, 3-phase electric current.

Where the character of a scrap is not specified in the following data, it is to be understood that it consists (on a hydrocarbon basis) of mixtures of natural rubber and GR–S ranging from approximately equal quantities to about 30% of either.

The "oil test compound" referred to in certain examples is made by compounding 200 parts by weight of reclaim, 2 parts of antioxidant (Neozone D), 5 parts of zinc oxide, 0.75 part of mercaptobenzothiazole, 0.5 part of hexamethylenetetramine, 60 parts of carbon black, 15 parts light process oil (Circo oil), 1 part of stearic acid and 2.5 parts of sulfur. For purposes of comparison and evaluation of the products of this invention, we may compare the product thus compound with neoprene as a standard, compounded as follows: 100 parts of neoprene, 2 parts antioxidant (Neozone D), 5 parts of zinc oxide, 4 parts of magnesium oxide, 0.5 part of an imidazoline accelerator (2-mercapto-imidazoline), 130 parts carbon black, 15 parts light process oil (Circo oil), 1 part stearic acid. So compounded neoprene yielded the following results:

| Cure, Min./lbs. | Tensile | Elongation | Hardness | 300% Modulus |
|---|---|---|---|---|
| 15/40 | 1,170 | 440 | 75 | 1,125 |
| 25/40 | 1,295 | 390 | 76 | 1,265 |
| 40/40 | 1,385 | 320 | 79 | 1,375 |

Specific gravity of compound—1.518

AFTER IMMERSION IN ASTM OIL #1, 48 HRS. AT 70° C.
(PERCENTS ARE BASED ON ORIGINAL FIGURES)

Percent weight loss, 40/40 _____ 2.20
Percent volume gain, 40/40 _____ 0.17
Final tensile, 40/40 _____ 1510
Percent gain _____ 16.6
Final elongation, 40/40 _____ 300
Percent loss _____ 6.25

AFTER IMMERSION IN CIRCO OIL, 48 HRS. AT 70° C.

Percent weight gain, 40/40 _____ 11.5
Percent volume gain, 40/40 _____ 19.0
Final tensile, 40/40 _____ 1325
Percent loss _____ 4.5
Final elongation, 40/40 _____ 360
Percent gain _____ 11.0

AFTER IMMERSION IN CIRCO OIL, 70 HRS. AT 70° C.

Percent weight gain, 40/40 _____ 14.0
Percent volume gain, 40/40 _____ 23.0

Circo oil is a light process oil having the following characteristics: viscosity at 100° F. 150–160 seconds, ASTM flashpoint 325°–330° F., fire point 370°–380° F., pour test —30° F. maximum, color NPA 2, Conrad carbon .02%, specific gravity 0.9309, A.P.I. gravity 20.5

In these examples "R.A.F." stands for Reclaimers' Association Formula, and the percentage figure (as "50%") accompanying it represents the percentage of rubber hydrocarbon in the reclaim. Thus, for a 50% R.A.F. the amount of reclaim in the formula would be twice as much as with a 100% R.A.F. and half as much as with a 25% R.A.F. The formula is as follows:

Reclaim (based on 50% rubber hydrocarbon) _____ 200
Zinc oxide _____ 5.0
Sulfur _____ 3.0
2-mercapto-benzothiazo (accelerator) _____ 0.5
Diphenyl guanidine (accelerator) _____ 0.2
Stearic acid _____ 2.0

*Example 1*

100 parts of thirty-mesh whole tire scrap were mixed with 2 parts petroleum oil, 12 parts petroleum resin, 4 parts maleic anhydride, and passed at a rate of 41 pounds per hour at 11.9 amps. thru a three-inch-diameter screw plasticator such as shown and described in the Elgin et al. U.S. Patent 2,653,348 (application Serial No. 38,474, filed July 13, 1948), except that the chamber 32, cone-shaped pin 33, and tube 34 are replaced by a horizontally-extending slab die having an internal passageway with a height of 0.65", a lateral extent of 1.9" rounded off rearwardly on a ¼" radius and diminishing forwardly in height over a length of 4" by means of an upwardly-sloping bottom surface and a downwardly-sloping upper surface to a height of 0.05" while expanding at its sides to a lateral extent of 2.5", the whole being formed by castings forming a nose which is 2¼" in height, 3½" in length, and 4¾" in lateral extent held in and projecting from a central opening in a plate about 6¹³⁄₁₆" square and ½" thick which is secured to a plate in which the rounding-off occurs.

The resulting product had Mooneys (ML/212/1–3) of 87½ (when tested 6 days after reclaiming), 98½ (10 days after reclaiming), and (ML/212/1–5) of 78 (6 days after reclaiming, 86 (10 days after reclaiming), processing factors of 10.7 and 12.0 respectively; a thermal softening factor after 6 days of 0.89 and after 10 days 0.97, sixteen-hour acetone extract (ASTM D-297-43T) of 17.7, and subsequent forty-eight-hour benzol extract of 12.3.

When cured according to R.A.F. 50% the following results were obtained:

| Cure, Min./lbs. | Tensile | Elongation | Hardness | 300% Modulus | Torsional hysteresis |
|---|---|---|---|---|---|
| 25/40 | 1,375 | 390 | 58 | 1,150 | |
| 35/40 | 1,455 | 370 | 59 | 1,225 | 0.234 |
| 45/40 | 1,450 | 360 | 61 | 1,260 | |

When cured in the oil test compound set forth above, the following results were obtained:

| Cure, Min./lbs. | Tensile | Elongation | Hardness | 300% Modulus |
|---|---|---|---|---|
| 15/40 | 945 | 350 | 60 | 850 |
| 25/40 | 1,090 | 350 | 62 | 1,015 |
| 40/40 | 1,000 | 260 | 64 | |

Cpd. Specific Gravity—1.252

IMMERSED IN ASTM OIL #1, 48 HRS. AT 70° C.

Percent weight gain:
  25/40 _____ 2.62
  40/40 _____ 0.45
Percent volume gain:
  25/40 _____ 5.62
  40/40 _____ 8.60
Final tensile, 25/40 _____ 980
Percent loss _____ 11.0
Final elongation, 25/40 _____ 230
Percent loss _____ 34.0
Final tensile, 40/40 _____ 1150
Percent gain _____ 15.0
Final elongation, 40/40 _____ 240
Percent loss _____ 7.5

IMMERSED IN CIRCO OIL, 48 HRS. AT 70° C.

Percent weight gain:
  25/40 _____ 62.5
  40/40 _____ 55.0
Percent volume gain:
  25/40 _____ 87.5
  40/40 _____ 76.5
Final tensile, 25/40 _____ 195
Percent loss _____ 82.0
Final elongation, 25/40 _____ 95
Percent loss _____ 73.0
Final tensile, 40/40 _____ 385
Percent loss _____ 61.5
Final elongation, 40/40 _____ 110
Percent loss _____ 57.5

IMMERSED IN CIRCO OIL, 70 HRS. AT 70° C.

Percent weight gain:
  25/40 _____ 70.0
  40/40 _____ 61.0
Percent volume gain:
  25/40 _____ 97.5
  40/40 _____ 85.5

*Example 2*

A mixture which was similar to the above, except that 8 parts of maleic anhydride were used, was similarly passed thru the machine at a rate of 64 pounds per hour at 12.9 amps.

The resulting product had 6-day Mooneys (ML/212/1–3) of 88½ and (ML/212/1–5) of 80, a processing factor of 11.7, a thermal softening factor of 0.67, acetone extract (ASTM D-297-43T) sixteen hours of 19.5, and subsequent benzol extract forty-eight hours of 7.6.

When cured (RAF 50%) the following results were obtained:

| Cure, Min./lbs. | Tensile | Elongation | Hardness |
|---|---|---|---|
| 35/40 | 1,325 | 300 | 64 |
| 45/40 | 1,350 | 260 | 66 |

When cured in the oil test compound the following results were obtained:

| Cure, Min./lbs. | Tensile | Elongation | Hardness |
|---|---|---|---|
| 15/40 | 930 | 240 | 70 |
| 25/40 | 1,045 | 250 | 73 |
| 40/40 | 1,080 | 220 | 73 |

Cpd. Specific Gravity—1.260

IMMERSED IN ASTM OIL #1, 48 HRS. AT 70° C.

Percent weight loss, 40/40 _____ 2.23
Percent volume loss, 40/40 _____ 1.48
Final tensile, 40/40 _____ 1280
Percent gain _____ 22.5
Final elongation, 40/40 _____ 280
Percent grain _____ 27.0

IMMERSED IN CIRCO OIL, 48 HRS. AT 70° C.

Percent weight gain, 40/40 _____ 37.0
Percent volume gain, 40/40 _____ 52.5
Final tensile, 40/40 _____ 370
Percent loss _____ 64.5
Final elongation, 40/40 _____ 80
Percent loss _____ 63.5

IMMERSED IN CIRCO OIL, 70 HRS. AT 70° C.

Percent weight gain, 40/40 _____ 41.0
Percent volume gain, 40/40 _____ 57.5

Example 3

A mixture which was similar to the above, except that 16 parts of maleic anhydride were used, was similarly passed thru the machine at a rate of 40 pounds per hour at 11.5 amps.

The resulting product had 6-day Mooneys (ML/212/1-3) of 111 and (ML/212/1-5) of 99½, a processing factor of 16.2, a thermal softening factor of 0.84, sixteen-hour acetone extract (ASTM D-297-43T) of 22.0, and subsequent forty-eight-hour benzol extract of 5.6.

When cured (RAF 50%), the following results were obtained:

| Cure, Min./lbs. | Tensile | Elongation | Hardness | 300% Modulus |
|---|---|---|---|---|
| 25/40 | 1,310 | 310 | 63 | 1,300 |
| 35/40 | 810 | 310 | 55 | 790 |
| 45/40 | 890 | 330 | 56 | 850 |

When cured in the oil test compound, the following results were obtained:

| Cure, Min./lbs. | Tensile | Elongation | Hardness |
|---|---|---|---|
| 15/40 | 720 | 260 | 62 |
| 25/40 | 790 | 270 | 65 |
| 40/40 | 880 | 260 | 66 |

Cpd. Specific Gravity—1.229

IMMERSED IN ASTM OIL #1, 48 HRS. AT 70° C.

Percent weight loss, 40/40 _____ 3.35
Percent volume loss, 40/40 _____ 3.26
Final tensile, 40/40 _____ 1275
Percent gain _____ 61.5
Final elongation, 40/40 _____ 205
Percent loss _____ 21.0

IMMERSED IN CIRCO OIL, 48 HRS. AT 70° C.

Percent weight gain, 40/40 _____ 35.5
Percent volume gain, 40/40 _____ 50.0
Final tensile, 40/40 _____ 280
Percent loss _____ 68.0
Final elongation, 40/40 _____ 90
Percent loss _____ 65.5

IMMERSED IN CIRCO OIL, 70 HRS. AT 70° C.

Percent weight gain, 40/40 _____ 39.5
Percent volume gain, 40/40 _____ 56.5

Example 4

A mixture which was similar to the above, except that 25 parts of maleic anhydride were used, was similarly passed thru the machine at a rate of 18 pounds per hour at 8 amps.

The resulting product had 6-day Mooneys (ML/212/1-3) of 125 and (ML/212/1-5) of 113, a processing factor of 16.7, a thermal softening factor of 0.91, acetone extract sixteen-hour (ASTM D-297-43T) of 25.1, and subsequent forty-eight-hour benzol extract of 3.6.

When cured (RAF 50%), the following results were obtained:

| Cure, Min./lbs. | Tensile | Elongation | Hardness | 300% Modulus |
|---|---|---|---|---|
| 25/40 | 1,150 | 310 | 67 | 1,140 |
| 35/40 | 1,120 | 325 | 64 | 1,095 |
| 45/40 | 1,170 | 360 | 65 | 1,090 |

When cured in the oil test compound the following results were obtained:

| Cure, Min./lbs. | Tensile | Elongation | Hardness |
|---|---|---|---|
| 15/40 | 855 | 280 | 71 |
| 25/40 | 995 | 260 | 72 |
| 40/40 | 1,060 | 210 | 73 |

Cpd. Specific Gravity—1.274

IMMERSED IN ASTM OIL, 48 HRS. AT 70° C.

Percent weight loss, 40/40 _____ 4.78
Percent volume loss, 40/40 _____ 5.29
Final tensile, 40/40 _____ 1465
Percent gain _____ 47.5
Final elongation, 40/40 _____ 195
Percent loss _____ 7.0

IMMERSED IN CIRCO OIL, 48 HRS. AT 70° C.

Percent weight gain, 40/40 _____ 24.5
Percent volume gain, 40/40 _____ 35.5
Final tensile, 40/40 _____ 475
Percent loss _____ 55.0
Final elongation, 40/40 _____ 115
Percent loss _____ 45.0

IMMERSED IN CIRCO OIL, 70 HRS. AT 70° C.

Percent weight gain 40/40 _____ 29.0
Percent volume gain, 40/40 _____ 41.5

Example 5

A mixture which was similar to that of Example 1 except that 5.4 parts of chloromaleic anhydride were used instead of the maleic anhydride, was passed thru the machine at a rate of 67 pounds per hour at 13 amps.

The resulting product had 6-day Mooneys (ML/212/1-3) of 84½ (93 after ten days, and (ML/212/1-5) of 75 (81½ after ten days), a processing factor of 11.9 (10.0 after ten days), a thermal softening factor after six days of 0.83 and after ten days 0.95, sixteen-hour acetone extract (ASTM D-297-43T) of 19.8, and subsequent forty-eight-hour benzol extract of 8.3.

When cured (RAF 50%) the following results were obtained:

| Cure, Min./lbs. | Tensile | Elongation | Hardness | 300% Modulus | Torsional Hysteresis |
|---|---|---|---|---|---|
| 25/40 | 1,255 | 305 | 61 | 1,235 | |
| 35/40 | 1,350 | 300 | 63 | 1,350 | 0.298 |
| 45/40 | 1,385 | 300 | 63 | 1,385 | |

When cured in the oil test compound the following results were obtained:

| Cure, Min./lbs. | Tensile | Elongation | Hardness | 300% Modulus |
|---|---|---|---|---|
| 15/40 | 950 | 300 | 64 | 950 |
| 25/40 | 1,050 | 290 | 66 | |
| 40/40 | 1,130 | 240 | 68 | |

Cpd. Specific Gravity—1.249

IMMERSED IN ASTM OIL #1, 48 HRS. AT 70° C.

Percent weight gain:
   25/40 _____ 1.67
   40/40 _____ 0.77
Percent volume gain:
   25/40 _____ 4.04
   40/40 _____ 5.44
Final tensile, 25/40 _____ 955
Percent loss _____ 9.0
Final elongation, 25/40 _____ 290
Percent change _____ 0
Final tensile, 40/40 _____ 1060
Percent loss _____ 6.2
Final elongation, 40/40 _____ 190
Percent loss _____ 21.0

IMMERSED IN CIRCO OIL, 48 HRS. AT 70° C.

Percent weight gain:
   25/40 _____ 63.0
   40/40 _____ 56.5
Percent volume gain:
   25/40 _____ 86.5
   40/40 _____ 78.5
Final tensile, 25/40 _____ 110
Percent loss _____ 85.5
Final elongation, 25/40 _____ 70
Percent loss _____ 76.0
Final tensile, 40/40 _____ 170
Percent loss _____ 85.0
Final elongation, 40/40 _____ 75
Percent loss _____ 68.5

IMMERSED IN CIRCO OIL, 70 HRS. AT 70° C.

Percent weight gain:
   25/40 _____ 73.5
   40/40 _____ 65.0
Percent volume gain:
   25/40 _____ 101.0
   40/40 _____ 90.0

Example 6

100 parts of twelve to twenty-mesh black inner tube stock were mixed with 1.5 parts of petroleum oil and 5.6 parts of maleic anhydride and charged into a "B" Banbury and acted on therein for 10 minutes at a starting temperature of 338° F., a rotor temperature of about 350° F., and a stock temperature (on discharge) of 310° F. The resulting product had Mooneys (ML/212/1–3) of 64½ and (ML/212/1–5) of 56½ and a processing factor of 5.5. When cured with 70% RAF it gave the following results:

| Cure, Min./lbs. | Tensile | Elongation | Hardness | 300% Modulus |
|---|---|---|---|---|
| 5/40 | 1,155 | 530 | 44 | 645 |
| 7.5/40 | 1,220 | 500 | 45 | 710 |
| 10/40 | 1,400 | 530 | 46 | 765 |
| 15/40 | 1,400 | 490 | 51 | 920 |

Example 7

100 parts of thirty-mesh scrap composed of one-third passenger peels, one-third truck and bus whole-tire, and one-third passenger whole-tire were mixed with 12 parts of petroleum resin and 4.8 parts of maleic acid, and passed thru the 3" screw plasticator of Example 1 at a rate of 38 pounds per hour with a power input of 11.4 amps.

The resulting product had Mooneys (ML/212/1–3) of 70 and (ML/212/1–5) of 60.

When cured (RAF 50%) the following results were obtained:

| Cure, Min./lbs. | Tensile | Elongation | Hardness | 300% Modulus |
|---|---|---|---|---|
| 30/40 | 1,460 | 425 | 53 | 1,065 |
| 40/40 | 1,555 | 410 | 55 | 1,155 |
| 50/40 | 1,565 | 390 | 55 | 1,215 |

Example 8

A mixture which was similar to that of Example 1, except that 4.80 parts of fumaric acid were substituted for the maleic anhydride, was similarly passed thru the machine at a rate of 39 pounds per hour at 12.9 amps.

The resulting product had Mooneys (ML/212/1–3) of 45 (after six days), 50 (after ten days), and (ML/212/1–5) of 41 (after six days), 44½ (after ten days), a processing factor of 4.8 (after six days), 6.0 (after ten days), a thermal softening factor after six days of 0.22 and after ten days 0.28, sixteen-hour acetone extract (ASTM D–297–43T) of 17.7, and subsequent forty-eight-hour benzol extract of 12.0.

When cured (RAF 50%) the following results were obtained:

| Cure, Min./lbs. | Tensile | Elongation | Hardness | 300% Modulus | Torsional hysteresis |
|---|---|---|---|---|---|
| 25/40 | 1,150 | 320 | 51 | 1,095 | |
| 35/40 | 1,250 | 340 | 52 | 1,145 | 0.109 |
| 45/40 | 1,250 | 320 | 53 | 1,200 | |

When cured in the oil test compound the following results were obtained:

| Cure, Min./lbs. | Tensile | Elongation | Hardness | 300% Modulus |
|---|---|---|---|---|
| 15/40 | 845 | 330 | 51 | 795 |
| 25/40 | 980 | 280 | 57 | |
| 40/40 | 950 | 260 | 59 | |

Cpd. Specific Gravity—1.249

IMMERSED IN ASTM OIL #1, 48 HRS. AT 70° C.

Percent weight gain, 25/40 _____ 2.78
Percent volume gain, 25/40 _____ 5.66
Final tensile, 25/40 _____ 865
Percent loss _____ 11.7
Final elongation, 25/40 _____ 230
Percent loss _____ 18.0

IMMERSED IN CIRCO OIL, 48 HRS. AT 70° C.

Percent weight gain, 25/40 _____ 59.0
Percent volume gain, 25/40 _____ 82.0
Final tensile, 25/40 _____ 160
Percent loss _____ 84.0
Final elongation, 25/40 _____ 95
Percent loss _____ 66.0

IMMERSED IN CIRCO OIL, 70 HRS. AT 70° C.

Percent weight gain, 25/40 _____ 66.5
Percent volume gain, 25/40 _____ 92.5

Example 9

A mixture which was similar to that of Example 1, except that 5.30 parts of itaconic acid were used instead of the maleic anhydride, was passed thru the machine at a rate of 60 pounds per hour at 13.6 amps.

The resulting product had Mooneys (ML/212/1–3) of 46½ (after six days), 49½ (after ten days), and (ML/212/1–5) of 43 (after six days), 45½ (after ten days), a processing factor of 4.6 (after six days), 5.6 (after ten days), a thermal softening factor after six days of 0.25 and after ten days 0.35, sixteen-hour acetone extract (ASTM D-297-43T) of 17.5, and subsequent forty-eight-hour benzole extract of 12.8.

When cured (RAF 50%) the following results were obtained:

| Cure, Min./lbs. | Tensile | Elongation | Hardness | 300% Modulus | Torsional hysteresis |
|---|---|---|---|---|---|
| 25/40 | 1,140 | 400 | 49 | 855 | |
| 35/40 | 1,165 | 390 | 50 | 875 | 0.113 |
| 45/40 | 1,200 | 350 | 52 | 980 | |

When cured in the oil test compound the following results were obtained:

| Cure, Min./lbs. | Tensile | Elongation | Hardness | 300% Modulus |
|---|---|---|---|---|
| 15/40 | 795 | 390 | 50 | 665 |
| 25/40 | 830 | 320 | 54 | 790 |
| 40/40 | 820 | 270 | 56 | |

Cpd. Specific Gravity—1.250

IMMERSED IN ASTM OIL #1, 48 HRS. AT 70° C.

Percent weight gain, 25/40 _____ 3.51
Percent volume gain, 25/40 _____ 6.80
Final tensile, 25/40 _____ 810
Percent loss _____ 2.4
Final elongation, 25/40 _____ 275
Percent loss _____ 14.0

IMMERSED IN CIRCO OIL, 48 HRS. AT 70° C.

Percent weight gain, 25/40 _____ 69.5
Percent volume gain, 25/40 _____ 97.0
Final tensile, 25/40 _____ 140
Percent loss _____ 83.0
Final elongation, 25/40 _____ 110
Percent loss _____ 65.5

IMMERSED IN CIRCO OIL, 70 HRS. AT 70° C.

Percent weight gain, 25/40 _____ 76.5
Percent volume gain, 25/40 _____ 106.0

*Example 10*

A mixture which was similar to that of Example 1 except that 4.6 parts of citraconic anhydride were substituted for the maleic anhydride and the petroleum oil was omitted, was similarly passed thru the machine at a screw speed of 60 r.p.m. at a rate of 44 pounds per hour at 12.4 amps.

The resulting product had Mooneys (ML/212/1–3) of 30½ and (ML/212/1–5) of 29.

When cured (RAF 50%) the following results were obtained:

| Cure, Min./lbs. | Tensile | Elongation | Hardness | 300% Modulus |
|---|---|---|---|---|
| 25/40 | 1,180 | 480 | 45 | 720 |
| 35/40 | 1,230 | 450 | 47 | 780 |
| 45/40 | 1,380 | 440 | 50 | 950 |

*Example 11*

A mixture which was similar to that of Example 1, except that 8.10 parts of citric acid were substituted for the maleic anhydride, was similarly passed thru the machine at a rate of 42 pounds per hour at 13.5 amps.

The resulting product had Mooneys (ML/212/1–3) of 47 (after six days), 54 (after ten days), and (ML/212/1–5) of 44½ (after six days), 49½ (after ten days), a processing factor of 4.3 (after six days), 6.1 (after ten days), a thermal softening factor after six days of 0.19 and after ten days 0.25, sixteen-hour acetone extract (ASTM D-297-43T) of 18.3, and subsequent forty-eight-hour benzol extract of 12.7.

When cured (RAF 50%) the following results were obtained:

| Cure, Min./lbs. | Tensile | Elongation | Hardness | 300% Modulus | Torsional hysteresis |
|---|---|---|---|---|---|
| 25/40 | 1,415 | 370 | 51 | 1,100 | |
| 35/40 | 1,380 | 350 | 52 | 1,165 | 0.101 |
| 45/40 | 1,375 | 340 | 53 | 1,190 | |

When cured in the oil test compound the following results were obtained:

| Cure, Min./lbs. | Tensile | Elongation | Hardness | 300% Modulus |
|---|---|---|---|---|
| 15/40 | 975 | 380 | 51 | 820 |
| 25/40 | 1,050 | 295 | 57 | |
| 40/40 | 1,085 | 280 | 59 | |

Cpd. Specific Gravity—1.253

IMMERSED IN ASTM OIL #1, 48 HRS. AT 70° C.

Percent weight gain, 25/40 _____ 1.24
Percent volume gain, 25/40 _____ 3.61
Final tensile, 25/40 _____ 1000
Percent loss _____ 4.8
Final elongation, 25/40 _____ 225
Percent loss _____ 24.0

IMMERSED IN CIRCO OIL, 48 HRS. AT 70° C.

Percent weight gain, 25/40 _____ 58.0
Percent volume gain, 25/40 _____ 81.5
Final tensile, 25/40 _____ 165
Percent loss _____ 84.5
Final elongation, 25/40 _____ 80
Percent loss _____ 73.0

IMMERSED IN CIRCO OIL, 70 HRS. AT 70° C.

Percent weight gain, 25/40 _____ 66.0
Percent volume gain, 25/40 _____ 92.0

*Example 12*

100 parts of thirty-mesh scrap consisting of one-third passenger peels, one-third truck and bus whole-tire and one-third passenger whole-tire were mixed with 12 parts of petroleum resin and 7.1 parts of aconitic acid, and passed thru a 3″ screw plasticator as set forth above at a rate of 31 lbs. per hour with a power input of 13.8 amps.

The resulting product had Mooneys (ML/212/1–3) of 44½ and (ML/212/1–5) of 39, a thermal softening factor of 0.565, and a processing factor of 7.5.

When cured (RAF 50%) the following results were obtained:

| Cure, Min./lbs. | Tensile | Elongation | Hardness | 300% Modulus |
|---|---|---|---|---|
| 30/40 | 1,410 | 475 | 46 | 830 |
| 40/40 | 1,460 | 440 | 48 | 920 |
| 50/40 | 1,430 | 410 | 50 | 985 |

*Example 13*

100 parts of thirty-mesh scrap consisting of one-half truck and bus whole-tire and one-half passenger whole-tire were mixed with 12 parts of petroleum resin and 3.5 parts of crotonic acid, and passed thru a 3″ screw plasticator as set forth above at a rate of 26 lbs. per hour with a power input of 14.0 amps.

The resulting product had Mooneys (ML/212/1–3) of 88 and (ML/212/1–5) of 85½.

When cured (RAF 50%) the following results were obtained:

| Cure, Min./lbs. | Tensile | Elongation | Hardness |
|---|---|---|---|
| 25/40 | 935 | 260 | 55 |
| 35/40 | 995 | 260 | 56 |
| 45/40 | 1,015 | 250 | 57 |

*Example 14*

100 parts of thirty-mesh scrap consisting of one-half truck and bus whole-tire and one-half passenger whole-tire were mixed with 12 parts of petroleum resin and 7 parts of crotonic acid, and passed thru a 3″ screw plasticator as set forth above at a rate of 42 lbs. per hour with a power input of 12.4 amps.

The resulting product had Mooneys (ML/212/1–3) of 76 and (ML/212/1–5) of 72.

When cured (RAF 50%) the following results were obtained:

| Cure, Min./lbs. | Tensile | Elongation | Hardness | 300% Modulus |
|---|---|---|---|---|
| 25/40 | 1,030 | 390 | 48 | 765 |
| 35/40 | 1,145 | 380 | 50 | 840 |
| 45/40 | 1,180 | 380 | 51 | 850 |

*Example 15*

100 parts of thirty-mesh scrap consisting of one-half truck and bus whole-tire and one-half passenger whole-tire were mixed with 12 parts of petroleum resin and 14 parts of crotonic acid, and passed thru a 3″ screw plasticator as set forth above at a rate of 24 lbs. per hour with a power input of 10 amps.

The resulting product had Mooneys (ML/212/1–3) of 114 and (ML/212/1–5) of 108½.

When cured (RAF 50%) the following results were obtained:

| Cure, Min./lbs. | Tensile | Elongation | Hardness | 300% Modulus |
|---|---|---|---|---|
| 25/40 | 1,205 | 390 | 52 | 855 |
| 35/40 | 1,210 | 370 | 54 | 950 |
| 45/40 | 1,195 | 370 | 54 | 920 |

*Example 16*

100 parts of thirty-mesh whole-tire scrap were mixed with 12 parts of petroleum resin, 0.3 part of mixed dixylyl disulfides, 2 parts of terpene hydrocarbon reclaiming agent, and 7.2 parts of citric acid, and passed thru a 3″ screw plasticator as set forth above at a rate of 41 pounds per hour at 12.4 amps.

The resulting product had Mooneys (ML/212/1–3) of 56 and (ML/212/1–5) of 53.

When cured (RAF 50%) the following results were obtained:

| Cure, Min./lbs. | Tensile | Elongation | Hardness | 300% Modulus |
|---|---|---|---|---|
| 25/40 | 1,400 | 440 | 54 | 925 |
| 35/40 | 1,385 | 390 | 55 | 1,035 |
| 45/40 | 1,465 | 375 | 56 | 1,155 |

*Example 17*

100 parts of forty-mesh truck and bus peels were mixed with 12 parts of petroleum resin and 4.6 parts of sorbic acid, and passed thru a 3″ screw plasticator as set forth above at a rate of 38 lbs. per hour with a power input of 12.8 amps.

The resulting product had Mooneys (ML/212/1–3) of 54 and (ML/212/1–5) of 50.

When cured (RAF 50%) the following results were obtained:

| Cure, Min./lbs. | Tensile | Elongation | Hardness | 300% Modulus |
|---|---|---|---|---|
| 25/40 | 1,615 | 450 | 50 | 915 |
| 35/40 | 1,675 | 415 | 52 | 1,090 |
| 45/40 | 1,700 | 415 | 53 | 1,125 |

*Example 18*

100 parts of thirty-mesh scrap consisting of one-third passenger peels, one-third truck and bus whole-tire, and one-third passenger whole-tire were mixed with 12 parts of petroleum resin and 6.1 parts of cinnamic acid, and passed thru a 3″ screw plasticator as set forth above at a rate of 34 lbs. per hour with a power input of 12.3 amps.

The resulting product had Mooneys (ML/212/1–3) of 41½ and (ML/212/1–5) of 35½, a thermal softening factor of 0.39, and a processing factor of 5.5.

When cured (RAF 50%) the following results were obtained:

| Cure, Min./lbs. | Tensile | Elongation | Hardness | 300% Modulus |
|---|---|---|---|---|
| 20/40 | 1,010 | 460 | 50 | 555 |
| 25/40 | 1,070 | 440 | 52 | 675 |
| 30/40 | 1,200 | 440 | 54 | 730 |
| 40/40 | 1,200 | 400 | 56 | 810 |
| 50/40 | 1,175 | 370 | 58 | 860 |

*Example 19*

100 parts of forty-mesh scrap composed of truck and bus peels were mixed with 12 parts of petroleum resin and 3.1 parts of crotonaldehyde, and passed thru a 3″ screw plasticator as set forth above at a rate of approximately 40 lbs. per hour.

The resulting product had Mooneys (ML/212/1–3) of 77½ and (ML/212/1–5) of 75½.

When cured (RAF 50%) the following results were obtained:

| Cure, Min./lbs. | Tensile | Elongation | Hardness | 300% Modulus |
|---|---|---|---|---|
| 25/40 | 1,470 | 450 | 43 | 775 |
| 35/40 | 1,495 | 440 | 44 | 815 |
| 45/40 | 1,410 | 415 | 44 | 865 |

*Example 20*

100 parts of thirty-mesh scrap consisting of one-third passenger peels, one-third truck and bus whole-tire, and one-third passenger whole-tire were mixed with 12 parts of petroleum resin and 5.4 parts of cinnamaldehyde, and passed thru a 3″ screw plasticator as set forth above at a rate of 34 lbs. per hour with a power input of 12.4 amps.

The resulting product had Mooneys (ML/212/1–3) of 26 and (ML/212/1–5) of 24.

When cured (RAF 50%) the following results were obtained:

| Cure, Min./lbs. | Tensile | Elongation | Hardness | 300% Modulus |
|---|---|---|---|---|
| 15/40 | 895 | 450 | 39 | 485 |
| 20/40 | 845 | 500 | 39 | 420 |
| 25/40 | 900 | 440 | 40 | 530 |
| 35/40 | 885 | 420 | 40 | 520 |
| 45/40 | 895 | 430 | 40 | 520 |

*Example 21*

100 parts of thirty-mesh whole-tire scrap were mixed with 12 parts of petroleum resin, 0.3 parts of mixed dixylyl disulfides, 2 parts of terpene hydrocarbon reclaiming agent, and 4 parts of cinnamaldehyde, and passed thru a 3" screw plasticator as set forth above at a rate of 35 lbs. per hour with a power input of 12 amps.

The resulting product had Mooneys (ML/212/1-3) of 26 and (ML/212/1-5) of 25.

When cured (RAF 50%) the following results were obtained:

| Cure, Min./lbs. | Tensile | Elongation | Hardness | 300% Modulus |
|---|---|---|---|---|
| 30/40 | 800 | 390 | 40 | 550 |
| 40/40 | 770 | 370 | 41 | 550 |
| 50/40 | 780 | 380 | 42 | 550 |

*Example 22*

100 parts of forty-mesh truck and bus peels were mixed with 12 parts of petroleum resin and 4 parts of mesityl oxide, and passed thru a 3" screw plasticator as set forth above at a rate of approximately 40 lbs. per hour.

The resulting product had Mooneys (ML/212/1-3) of 92 and (ML/212/1-5) of 87.

When cured (RAF 50%) the following results were obtained:

| Cure, Min./lbs. | Tensile | Elongation | Hardness | 300% Modulus |
|---|---|---|---|---|
| 25/40 | 1,250 | 420 | 42 | 765 |
| 35/40 | 1,275 | 390 | 43 | 850 |
| 45/40 | 1,285 | 390 | 43 | 830 |

*Example 23*

100 parts of thirty-mesh scrap consisting of one-third passenger peels, one-third truck and bus whole-tire, and one-third passenger whole-tire, were mixed with 12 parts of petroleum resin and 7 parts of benzalacetone, and passed thru a 3" screw plasticator as set forth above at a rate of 35 lbs. per hour with a power input of 12.4 amps.

The resulting product had Mooneys (ML/212/1-3) of 25½ and (ML/212/1-5) of 23.

When cured (RAF 50%) the following results were obtained:

| Cure, Min./lbs. | Tensile | Elongation | Hardness | 300% Modulus |
|---|---|---|---|---|
| 25/40 | 755 | 440 | 35 | 410 |
| 35/40 | 735 | 420 | 35 | 440 |
| 45/40 | 740 | 410 | 35 | 455 |

*Example 24*

100 parts of thirty-mesh whole-tire scrap were mixed with 12 parts of petroleum resin, 0.3 part of mixed di-xylyl disulfides, 2 parts of terpene hydrocarbon reclaiming agent, and 4 parts of benzalacetone, and passed thru a 3" screw plasticator as set forth above at a rate of 35 lbs. per hour with a power input of 12 amps.

The resulting product had Mooneys (ML/212/1-3) of 25 and (ML/212/1-5) of 24.

When cured (RAF 50%) the following results were obtained:

| Cure, Min./lbs. | Tensile | Elongation | Hardness | 300% Modulus |
|---|---|---|---|---|
| 30/40 | 760 | 370 | 40 | 560 |
| 40/40 | 710 | 360 | 40 | 530 |
| 50/40 | 720 | 360 | 40 | 550 |

*Example 25*

100 parts of forty-mesh scrap consisting of truck and bus peels were mixed with 12 parts of petroleum resin and 4.1 parts of methyl methacrylate, and passed thru a 3" screw plasticator as set forth above at a rate of approximately 40 lbs. per hour.

The resulting product had Mooneys (ML/212/1-3) of 59 and (ML/212/1-5) of 55.

When cured (RAF 50%) the following results were obtained:

| Cure, Min./lbs. | Tensile | Elongation | Hardness | 300% Modulus |
|---|---|---|---|---|
| 25/40 | 1,280 | 435 | 42 | 720 |
| 35/40 | 1,350 | 435 | 43 | 735 |
| 45/40 | 1,255 | 410 | 43 | 755 |

*Example 26*

100 parts of thirty-mesh scrap consisting of one-third passenger peels, one-third truck and bus whole-tire, and one-third passenger whole-tire, were mixed with 12 parts of petroleum resin and 7 parts of diethyl maleate, and passed thru a 3" screw plasticator as set forth above at a rate of 47 lbs. per hour with a power input of 12 amps.

The resulting product had Mooneys (ML/212/1-3) of 29 and (ML/212/1-5) of 26.

When cured (RAF 50%) the following results were obtained:

| Cure, Min./lbs. | Tensile | Elongation | Hardness | 300% Modulus |
|---|---|---|---|---|
| 30/40 | 920 | 440 | 39 | 530 |
| 40/40 | 940 | 410 | 40 | 570 |
| 50/40 | 950 | 410 | 40 | 595 |

*Example 27*

100 parts of thirty-mesh scrap consisting of one-third passenger peels, one-third truck and bus whole-tire, and one-third passenger whole-tire were mixed with 12 parts of petroleum resin and 9.3 parts of dibutyl maleate, and passed thru a 3" screw plasticator as set forth above at a rate of 39 lbs. per hour with a power input of 11.9 amps.

The resulting product had Mooneys (ML/212/1-3) of 24 and (ML/212/1-5) of 22.

When cured (RAF 50%) the following results were obtained:

| Cure, Min./lbs. | Tensile | Elongation | Hardness | 300% Modulus |
|---|---|---|---|---|
| 30/40 | 770 | 470 | 33 | 355 |
| 40/40 | 740 | 440 | 33 | 395 |
| 50/40 | 780 | 430 | 34 | 420 |

*Example 28*

100 parts of thirty-mesh whole-tire scrap were mixed with 12 parts of petroleum resin, 0.3 parts of di-xylyl disulfides, 2 parts of terpene hydrocarbon reclaiming agent, 3.33 parts of diethyl maleate, and 0.67 parts of dibutyl maleate, and passed thru a 3" screw plasticator as set forth above at a rate of 37 lbs. per hour with a power input of 12 amps.

The resulting product had Mooneys (ML/212/1-3) of 25 and (ML/212/1-5) of 23.

When cured (RAF 50%) the following results were obtained:

| Cure, Min./lbs. | Tensile | Elongation | Hardness | 300% Modulus |
|---|---|---|---|---|
| 30/40 | 850 | 410 | 38 | 560 |
| 40/40 | 840 | 390 | 40 | 580 |
| 50/40 | 880 | 390 | 41 | 590 |

*Example 29*

100 parts of forty-mesh scrap consisting of truck and bus peels were mixed with 12 parts of petroleum resin, 2 parts of petroleum aromatic distillate and 5.4 parts of chloromaleic anhydride, and passed thru a 3" screw plasticator as set forth above at a rate of 50 lbs. per hour with a power input of 12 amps.

The resulting product had Mooneys (ML/212/1-3) of 45 and (ML/212/1-5) of 43.

When cured (RAF 50%) the following results were obtained:

| Cure, Min./lbs. | Tensile | Elongation | Hardness | 300% Modulus |
|---|---|---|---|---|
| 25/40 | 2,100 | 460 | 60 | 1,485 |
| 35/40 | 1,990 | 430 | 61 | 1,520 |
| 45/40 | 2,100 | 440 | 62 | 1,545 |

Example 30

100 parts of thirty-mesh scrap were mixed with 12 parts of petroleum resin and 9 parts of citric acid, and passed thru a 3" screw plasticator as set forth above at a rate of 30 lbs. per hour with a power input of 11.5 amps.

The resulting product had Mooneys (ML/212/1-3) of 41 and (ML/212/1-5) of 38.

When cured (RAF 50%) the following results were obtained:

| Cure, Min./lbs. | Tensile | Elongation | Hardness | 300% Modulus |
|---|---|---|---|---|
| 20/40 | 1,370 | 450 | 49 | 900 |
| 30/40 | 1,460 | 430 | 51 | 1,040 |
| 40/40 | 1,465 | 390 | 52 | 1,140 |
| 50/40 | 1,500 | 390 | 53 | 1,185 |

Example 31

100 parts of thirty-mesh scrap were mixed with 12 parts of petroleum resin and 10 parts citric acid, and passed thru a 3" screw plasticator as set forth above at a rate of 36 lbs. per hour with a power input of 11.8 amps.

The resulting product had Mooneys (ML/212/1-3) of 45 and (ML/212/1-5) of 41-1/2.

When cured (RAF 50%) the following results were obtained:

| Cure, Min./lbs. | Tensile | Elongation | Hardness | 300% Modulus |
|---|---|---|---|---|
| 20/40 | 1,460 | 460 | 51 | 960 |
| 30/40 | 1,510 | 430 | 51 | 1,080 |
| 40/40 | 1,535 | 410 | 54 | 1,145 |
| 50/40 | 1,515 | 390 | 55 | 1,160 |

Example 32

100 parts of thirty-mesh truck and bus peels were mixed with 12 parts of petroleum resin, 0.3 parts of di-xylyl disulfides, 2 parts of terpene hydrocarbon reclaiming agent, 1 part water, and 3 parts of maleic anhydride, and passed thru a 3" screw plasticator as set forth above at a rate of 40 lbs. per hour with a power input of 11.3 amps.

The resulting product had Mooneys (ML/212/1-3) of 37 and (ML/212/1-5) of 33.

When cured (RAF 50%) the following results were obtained:

| Cure, Min./lbs. | Tensile | Elongation | Hardness |
|---|---|---|---|
| 30/40 | 1,220 | 490 | 45 |
| 40/40 | 1,210 | 460 | 46 |
| 50/40 | 1,230 | 440 | 47 |

Example 33

100 parts of thirty-mesh whole-tire scrap were mixed with 2 parts petroleum oil, 12 parts petroleum resin, and 2.5 parts of maleic anhydride, and processed in the 3" plasticator of Example 1 at a rate of 42 lbs. per hour at 13 amps.

The resulting product had Mooneys (ML/212/1-3) of 58½ and (ML/212/1-5) of 53, a processing factor of 6.8, and a thermal softening factor of 0.55.

When cured (RAF 50%) the following results were obtained:

| Cure, Min./lbs. | Tensile | Elongation | Hardness | 300% Modulus | Torsional hysteresis |
|---|---|---|---|---|---|
| 25/40 | 1,100 | 425 | 49 | 750 |  |
| 35/40 | 1,155 | 380 | 50 | 905 | 0.134 |
| 45/40 | 1,175 | 350 | 51 | 1,020 |  |

Example 34

100 parts of twelve-mesh natural rubber tubes were mixed with 0.25 part of tertiary butyl mercaptan, 1.5 parts of petroleum oil, and 5.6 parts of maleic anhydride, and processed in the 3" plasticator of Example 1 at 11.8 amps. at a rate of 50 pounds per hour.

The resulting product had Mooneys (ML/212/1-3) of 65½ and (ML/212/1-5) of 62½, a processing factor of 4.2, and a thermal softening factor of 0.33.

When cured (RAF 70%) the following results were obtained:

| Cure, Min./lbs. | Tensile | Elongation | Hardness | 300% Modulus |
|---|---|---|---|---|
| 25/40 | 2,030 | 535 | 54 | 1,150 |
| 35/40 | 2,010 | 470 | 55 | 1,320 |
| 45/40 | 1,885 | 435 | 56 | 1,350 |

Example 35

100 parts of six-mesh GR-S tubes were mixed with 0.696 part of tertiary butyl mercaptan, 2.1 parts of petroleum oil, 11.22 parts of petroleum resin, 2.82 parts of crude tall oil pitch, 3.0 parts of whiting, and 4.8 parts of maleic anhydride, and processed in the 3" plasticator of Example 1 at 14 amps. at a rate of 44 pounds per hour.

The resulting product had Mooneys (ML/212/1-3) of 72½ and (ML/212/1-5) of 67½, a processing factor of 7.0, and a thermal softening factor of 0.41.

When cured (RAF 60%) the following results were obtained:

| Cure, Min./lbs. | Tensile | Elongation | Hardness | 300% Modulus |
|---|---|---|---|---|
| 25/40 | 940 | 375 | 55 | 760 |
| 35/40 | 1,010 | 355 | 56 | 880 |
| 45/40 | 1,110 | 330 | 59 | 980 |

Materials useful for many purposes may be obtained by extending the product with oil, which may advantageously in many instances be added to the mix before the treatment.

Example 36

100 parts of thirty-mesh whole tire scrap were mixed with 12 parts of petroleum resin, 4 parts of maleic anhydride, and 28 parts of a predominantly aromatic extender oil having a specific gravity of 1.03, a viscosity at 100° F. of 4600 cs. and at 210° F. of 20 cs., and an initial boiling point of 360° F. at 1 mm. (e.g., Dutrex-20), processed in the 3" plasticator of Example 1 at 12.0 amps at a rate of 79 lbs. per hour and mill cooled.

The resulting product had Mooneys (ML/212/1-3) of 36½ and (ML/212/1-5) of 35.

When cured (RAF 50%), the following results were obtained:

| Cure, Min./lbs. | Sp. Gr. | Tensile | Elongation | Hardness | 300% Modulus |
|---|---|---|---|---|---|
| 30/40 | | 730 | 400 | 38 | 555 |
| 40/40 | | 715 | 325 | 40 | 660 |
| 50/40 | 1.159 | 820 | 330 | 42 | 745 |

Among the other extender oils commonly used are the following: Circosol 2-XH (Sun Oil Co.)—Odorless, light-green, viscous liquid; sp. gr. 0.940; Saybolt viscosity at 100° F. about 2,000 sec. Califlux TT (Golden Bear Oil Co.)—A mixture of naphthenic hydrocarbons, predominantly unsaturated; purity 100% distillable; color reddish-brown, transparent in thin layers; aniline point below 40° C., (50:50 n-heptane); boiling point initial minimum 160° C./at 10 mm. Hg; specific gravity 1.01–1.03; viscosity 15,000–50,000 cp. at 25° C., 30–100 cp. at 90° C. Sundex 53 (Sun Oil Co.)—Odorless, viscous, dark-red liquid; sp. gr. 0.976; Saybolt viscosity at 100° F. about 3,000 sec. Shell SPX–97 (Shell Oil Co.).

Example 37

100 parts of thirty-mesh whole-tire scrap were mixed with 3 parts of petroleum resin, 4 parts of maleic anhydride, and 7 parts of extender oil (as above) and processed in the 3" plasticator of Example 1 at 12.4 amps. at a rate of 34 lbs. per hour.

The resulting product had Mooneys (ML/212/1-3) of 140 and (ML/212/1-5) of 122½.

When cured (RAF 55%) the following results were obtained:

| Cure, Min./lbs. | Tensile | Elongation | Hardness |
|---|---|---|---|
| 30/50 | 1,465 | 260 | 68 |
| 40/50 | 1,555 | 220 | 70 |
| 50/50 | 1,525 | 220 | 69 |

Example 37–A 100 parts of thirty-mesh whole-tire scrap were mixed with 12 parts of petroleum resin 0.3 part of di-xylyl disulfides, 2 parts of petroleum oil, 16 parts of maleic anhydride, and 30 parts of extender oil (as above) and processed in the 3" plasticator of Example 1.

The resulting product had Mooneys (ML/212/1-3) of 32½ and (ML/212/1-5) of 29.

When cured (RAF 60%) the following results were obtained:

| Cure, Min./lbs. | Tensile | Elongation | Hardness | 200% Modulus |
|---|---|---|---|---|
| 15/40 | 750 | 250 | 58 | 680 |
| 30/40 | 870 | 240 | 59 | 790 |
| 45/40 | 845 | 200 | 60 | 845 |

Example 38

100 parts of thirty-mesh whole-tire scrap were mixed with 6 parts of petroleum resin, 4 parts of maleic anhydride, and 14 parts of extender oil (as above) and processed in the 3" plasticator of Example 1 at 12.1 amps. at a rate of 40 lbs. per hour.

The resulting product had Mooneys (ML/212/1-3) of 113 and (ML/212/1-5) of 98.

When cured (RAF 58%) the following results were obtained:

| Cure, Min./lbs. | Tensile | Elongation | Hardness |
|---|---|---|---|
| 30/50 | 1,380 | 270 | 64 |
| 40/50 | 1,400 | 250 | 65 |
| 50/50 | 1,440 | 215 | 66 |

Example 39

100 parts of thirty-mesh whole-tire scrap were mixed with 9 parts of petroleum resin, 4 parts of maleic anhydride, and 21 parts of extender oil (as above) and processed in the 3" plasticator of Example 1 at 11.9 amps. at a rate of 52 lbs. per hour.

The resulting product had Mooneys (ML/212/1-3) of 82 and (ML/212/1-5) of 72½.

When cured (RAF 62%) the following results were obtained:

| Cure, Min./lbs. | Tensile | Elongation | Hardness |
|---|---|---|---|
| 30/50 | 1,195 | 275 | 58 |
| 40/50 | 1,210 | 280 | 58 |
| 50/50 | 1,220 | 250 | 59 |

Example 40

100 parts of thirty-mesh whole-tire scrap were mixed with 12 parts of petroleum resin, 4 parts of maleic anhydride, and 28 parts of extender oil (as above) and processed in the 3" plasticator of Example 1 at 12.0 amps. at a rate of 56 lbs. per hour.

The resulting product had Mooneys (ML/212/1-3) of 76 and (ML/212/1-5) of 64.

When cured (RAF 64%) the following results were obtained:

| Cure, Min./lbs. | Tensile | Elongation | Hardness |
|---|---|---|---|
| 30/50 | 1,025 | 300 | 51 |
| 40/50 | 1,075 | 290 | 51 |
| 50/50 | 1,085 | 280 | 52 |

Example 41

100 parts of thirty-mesh whole-tire scrap were mixed with 15 parts of petroleum resin, parts of maleic anhydride, and 35 parts of extender oil (as above) and processed in the 3" plasticator of Example 1 at 12.3 amps. at a rate of 70 lbs. per hour.

The resulting product had Mooneys (ML/212/1-3) of 79½ and (ML/212/1-5) of 70½.

When cured (RAF 67%) the following results were obtained:

| Cure, Min./lbs. | Tensile | Elongation | Hardness |
|---|---|---|---|
| 40/50 | 760 | 290 | 45 |
| 50/50 | 810 | 290 | 46 |

Example 42

100 parts of thirty-mesh whole-tire scrap were mixed with 22.6 parts of petroleum resin, 4 parts of maleic anhydride, and 52.4 parts of extender oil (as above) and processed in the 3" plasticator of Example 1 at 11.8 amps. at a rate of 77 lbs. per hour.

The resulting product had Mooneys (ML/212/1-3) of 58½ and (ML/212/1-5) of 55.

When cured (RAF 71%) the following results were obtained:

| Cure, Min./lbs. | Tensile | Elongation | Hardness |
|---|---|---|---|
| 30/50 | 455 | 290 | 34 |
| 40/50 | 485 | 300 | 34 |
| 50/50 | 530 | 300 | 35 |

Example 43

100 parts of thirty-mesh whole-tire scrap were mixed with 30 parts of petroleum resin, 4 parts of maleic anhydride, and 70 parts of extender oil (as above) and processed in the 3" plasticator of Example 1 at 9 amps. at a rate of 46 lbs. per hour.

The resulting product had Mooneys(ML/212/1–3) of 37 and (ML/212/1–5) of 35.

When cured (RAF 75%) the following results were obtained:

| Cure, Min./lbs. | Tensile | Elongation | Hardness |
|---|---|---|---|
| 30/50 | 365 | 300 | 25 |
| 40/50 | 380 | 300 | 26 |
| 50/50 | 385 | 290 | 28 |

Example 44

100 parts of thirty-mesh whole-tire scrap were mixed with 4.6 parts of petroleum resin, and 4 parts of maleic anhydride, and processed in the 3" plasticator of Example 1 at 12.5 amps at a rate of 35 lbs. per hour.

400 parts of the above reclaim were mixed with 7.5 parts of petroleum resin and 28 parts of extender oil (as above) in a mill for 10 minutes.

The resulting product had Mooneys(ML/212/1–3) of 93 and (ML/212/1–5) of 80.

When cured (RAF 55%) the following results were obtained:

| Cure, Min./lbs. | Tensile | Elongation | Hardness |
|---|---|---|---|
| 30/40 | 1,125 | 270 | 61 |
| 40/40 | 1,120 | 250 | 62 |
| 50/40 | 1,210 | 220 | 63 |

Example 45

400 parts of the reclaim of Example 44 were mixed with 19.5 parts of petroleum resin and 56 parts of extender oil (as above) in a mill for 20 minutes.

The resulting product had Mooneys(ML/212/1–3) of 68 and (ML/212/1–5) of 58½.

When cured (RAF 58%) the following results were obtained:

| Cure, Min./lbs. | Tensile | Elongation | Hardness |
|---|---|---|---|
| 40/40 | 985 | 240 | 56 |
| 50/40 | 985 | 210 | 57 |

Example 46

400 parts of the reclaim of Example 44 were mixed with 31.5 parts of petroleum resin and 84 parts of extender oil (as above) in a mill for 20 minutes.

The resulting product had Mooneys(ML/212/1–3) of 47½ and (ML/212/1–5) of 42.

When cured (RAF 62%) the following results were obtained:

| Cure, Min./lbs. | Tensile | Elongation | Hardness |
|---|---|---|---|
| 40/40 | 780 | 225 | 51 |
| 50/40 | 860 | 225 | 52 |

Example 47

400 parts of the reclaim of Example 44 were mixed with 43.5 parts of petroleum resin and 112 parts of extender oil (as above) in a mill for 30 minutes.

The resulting product had Mooneys(ML/212/1–3) of 36½ and (ML/212/1–5) of 32½.

When cured (RAF 64%) the following results were obtained:

| Cure, Min./lbs. | Tensile | Elongation | Hardness |
|---|---|---|---|
| 40/40 | 655 | 220 | 46 |
| 50/40 | 665 | 200 | 47 |

Materials useful for many purposes may also be provided by reaction products formed from scrap vulcanized rubbery hydrocarbon material, high-Mooney—e.g., 100 to 300 (ML/212/5–1—as measured on an ML machine or calculated from an MS measurement) butalastic polymers, and substances having an unsaturation alpha to an electron-acceptor group. Such reaction products may be formed by inter-reacting all of these materials simultaneously or by reacting certain of the above materials with partial reaction products of the other two. Amounts of the unsaturated substances in proportions similar to those indicated above, e.g., over 0.0408 mol with respect to 100 grams of hydrocarbon in the mixed material may be used.

Example 48

100 parts of thirty-mesh whole tire scrap were mixed with 12 parts of petroleum resin and 0.3 part of di-xylyl disulfides and 2 parts of terpene hydrocarbon reclaiming agent, and processed in the 3" plasticator of Example 1 at 10.9 amps. at a rate of 34 lbs. per hour.

30 parts of the above reclaim were mixed with 70 parts of a copolymer of butadiene-styrene in the ratio of 75 parts by weight of butadiene to 25 parts of styrene with a Mooney (ML/212/5–1) of about 125 to 150 ("cold rubber," at 41° F.) and 4 parts of petroleum resin (PDO–40).

4 parts of maleic anhydride were then mixed in, and the mixture put thru a 3" plasticator as in Example 1 but having a water-cooled screw, at 17 amps.

The externally-measured temperatures were as follows: oil, 250° F.; jacket, 250° F.; rear, 245° F.; center, 260° F.; forward, 265° F.; cone, 232° F.; die, 266° F.

When cured with the following compound:

| | |
|---|---|
| Rubber hydrocarbon | 100.0 |
| Stearic acid | 1.0 |
| Benzothiazyl disulfide | 1.5 |
| Zinc oxide | 5.0 |
| Carbon black (EPC Micronex) | 40.0 |
| Sulfur | 2.0 | the following results were obtained:

| Cure, Min./° F. | Tensile | Elongation | Hardness | 300% Modulus |
|---|---|---|---|---|
| 45/280 | 2,500 | 560 | 70 | 1,320 |
| 65/280 | 2,775 | 530 | 71 | 1,455 |
| 75/280 | 2,800 | 540 | 71 | 1,450 |
| 90/280 | 2,930 | 443 | 72 | 1,875 |

Example 49

30 parts of thirty-mesh whole-tire scrap were mixed with 70 parts of the copolymer of Example 48, 4 parts petroleum resin, and 8 parts viscous liquid hydrocarbon plasticizer (Dutrex 20). 4 parts of maleic anhydride were then mixed in, and the mixture put thru a 3" plasticator as in Example 1.

The product gave a Mooney (ML/212/1–5) of 116.

When cured with the compound of Example 48 the following results were obtained:

| Cure, Min./° F. | Tensile | Elongation | Hardness | 300% Modulus |
|---|---|---|---|---|
| 45/280 | 1,965 | 500 | 64 | 1,080 |
| 60/280 | 2,090 | 493 | 64 | 1,195 |
| 75/280 | 2,270 | 470 | 65 | 1,370 |
| 90/280 | 2,320 | 437 | 68 | 1,600 |

Example 50

25 parts of the reclaim of Example 48 were mill-blended with 100 parts of the copolymer of Example 48 and 10 parts liquid polybutadiene.

4 parts maleic anhydride were then mixed in, and the mixture put thru a 3" plasticator (as in Example 1).

When cured with the following compound:

| | |
|---|---|
| Rubber hydrocarbon (including extender oils) | 100.0 |
| Stearic acid | 1.0 |
| Benzothiazyl disulfide | 1.5 |
| Zinc oxide | 5.0 |
| Carbon black | 40.0 |
| Sulfur | 2.0 | the following results were obtained:

| Cure, Min./° F. | Tensile | Elongation | Hardness |
|---|---|---|---|
| 30/280 | 1,700 | 270 | 72 |
| 45/280 | 1,870 | 233 | 74 |
| 60/280 | 1,880 | 197 | 75 |
| 75/280 | 1,985 | 233 | 77 |
| 90/280 | 1,825 | 197 | 78 |

*Example 51*

25 parts of the reclaim of Example 48 were mill-blended with 100 parts of the copolymer of Example 48, 10 parts of liquid polybutadiene, and 2 parts of catalyst (benzoyl peroxide), and put thru a 3" plasticator (as in Example 1).

When cured with the compound of Example 50, the following results were obtained:

| Cure, Min./° F. | Tensile | Elongation | Hardness |
|---|---|---|---|
| 45/280 | 1,420 | 173 | 71 |
| 60/280 | 1,465 | 183 | 75 |
| 75/280 | 1,495 | 163 | 75 |
| 90/280 | 1,450 | 143 | 76 |

*Example 52*

100 parts of six-mesh butyl tubes were mixed with 4.8 parts of maleic anhydride and processed in the 3" plasticator of Example 1 at 10–15 amps. at a rate of over 100 pounds per hour, and an oil temperature of 400° F.

The resulting product had Mooneys (ML/212/1–3) of 40 and (ML/212/1–5) of 38.

When cured with the following compound:

| | |
|---|---|
| Butyl reclaim | 100.0 |
| Tetramethyl thiuram disulfide | 0.6 |
| Mercaptobenzothiazole | 0.6 |
| Zinc oxide | 5.0 |
| Stearic acid | 0.5 |
| Sulfur | 1.25 |
| Accelerator (selenium diethyl dithiocarbamate) | 0.6 | the following results were obtained:

| Cure, Min./° F. | Tensile | Elongation | Hardness | 300% Modulus |
|---|---|---|---|---|
| 20/330 | 1,550 | 490 | 53 | 1,185 |
| 20/307 | 1,535 | 495 | 53 | 1,110 |
| 45/307 | 1,555 | 460 | 54 | 1,210 |

*Example 53*

100 parts of thirty-mesh whole-tire were mixed with 0.3 part of di-xylyl disulfide reclaiming agent, 2 parts of terpene hydrocarbon reclaiming agent, 4 parts of maleic anhydride, 1 part of catalyst (benzoyl peroxide), and 12 parts of petroleum resin and processed in the 3" plasticator of Example 1 at 10.9 amps at a rate of 36 lbs. per hour.

The resulting product had Mooneys (ML/212/1–3) of 102 and (ML/212/1–5) of 88.

When cured (RAF 50%) the following results were obtained:

| Cure, Min./lbs. | Tensile | Elongation | Hardness | 300% Modulus |
|---|---|---|---|---|
| 30/40 | 1,230 | 400 | 61 | 1,025 |
| 40/40 | 1,320 | 400 | 63 | 1,100 |
| 50/40 | 1,390 | 400 | 63 | 1,130 |

*Example 54*

100 parts of thirty-mesh whole-tire were mixed with 0.3 part of di-xylyl disulfide reclaiming agent, 2 parts of terpene hydrocarbon reclaiming agent, 4 parts of itaconic acid, 1 part of catalyst (benzoyl peroxide), and 12 parts of petroleum resin and processed in the 3" plasticator of Example 1 at 10.8 amps. at a rate of 38 lbs. per hour.

The resulting product had Mooneys (ML/212/1–3) of 29 and (ML/212/1–5) of 25.

When cured (RAF 50%) the following results were obtained:

| Cure, Min./lbs. | Tensile | Elongation | Hardness | 300% Modulus |
|---|---|---|---|---|
| 30/40 | 1,060 | 430 | 51 | 730 |
| 40/40 | 1,120 | 410 | 52 | 800 |
| 50/40 | 1,120 | 380 | 54 | 870 |

Instead of benzoyl peroxide of other catalysts, e.g., aluminum chloride, may be used.

*Example 55*

100 parts of vulcanized polybutadiene compound (less than 10-mesh) were mixed with 1.65 parts of di-xylyl disulfide reclaiming agent, 1.1 parts of petroleum oil, 18.7 parts of petroleum resin, and 8.0 parts of maleic anhydride, and processed in a number ½ Royle tubing machine equipped with an electrically heated annular die of four-inch length and tapering from one and one eighth inches in internal diameter to one half inch, and fitted with a pin tapering from three quarters of an inch to three eighths of an inch. The pin continues for 11/16 inch and this section is provided with interchangeable bushings so that the thickness of the extruded material can be used to control the rate.

The resulting product had Mooneys (ML/212/1–3) of 166½ and (ML/212/1–5) of 163, and a processing factor of 7.3.

When cured with the following compound:

| | |
|---|---|
| Polybutadiene reclaim | 100.0 |
| Zinc oxide | 10.0 |
| Sulfur | 6.0 |
| Mercaptobenzothiazole | 1.0 |
| Diphenyl guanidine | 0.4 |
| Stearic acid | 4.0 | the following results were obtained:

| Cure, Min./lbs. | Tensile | Elongation | Hardness | 100% Modulus |
|---|---|---|---|---|
| 60/40 | 2,090 | 130 | 77 | 1,680 |

*Example 56*

100 parts of twenty-four-mesh GR–S flaps were mixed with 0.696 part of tertiary butyl mercaptan, 2.1 parts of petroleum oil, 11.2 parts of petroleum resin, 2.82 parts of crude tall oil pitch, 3 parts of whiting, and 4 parts of maleic anhydride, and processed in the 3" plasticator of Example 1 at 13.5 amps.

The resulting product had Mooneys (ML/212/1–3) of 82 and (ML/212/1–5) of 77, a processing factor of 8.1, and a thermal softening factor of 0.44.

When cured (RAF 50%) the following results were obtained:

| Cure, Min./lbs. | Tensile | Elongation | Hardness |
|---|---|---|---|
| 25/40 | 800 | 140 | 59 |
| 35/40 | 990 | 240 | 61 |
| 45/40 | 1,160 | 230 | 62 |

I claim:

1. A reaction product of sulphur-vulcanized hydrocarbon rubbery polymer of a conjugated diene and substantially over 0.04 mol, and up to 0.51 mol, per 100 grams of rubber hydrocarbon, of material having a carbon-to-carbon unsaturation alpha to an electron-acceptor group and being of the class consisting of carboxylic acids, anhydrides of carboxylic acids, aldehydes, ketones, esters of carboxylic acids, and nitriles.

2. A reaction product as set forth in claim 1 wherein said material comprises an anhydride of a carboxylic acid.

3. A reaction product as set forth in claim 2 wherein said material comprises maleic anhydride.

4. A reaction product as set forth in claim 2 wherein said material comprises chloromaleic anhydride.

5. A reaction product as set forth in claim 1 wherein said material comprises an aldehyde.

6. A reaction product as set forth in claim 5 wherein said material is crotonaldehyde.

7. A reaction product as set forth in claim 1 wherein said material comprises a ketone.

8. A reaction product as set forth in claim 7 wherein said material is mesityl oxide.

9. A reaction product as set forth in claim 1 and which is extended by the presence of from about 7 parts to about 70 parts of hydrocarbon extender oil per 50 parts of rubber hydrocarbon.

10. A reaction product as set forth in claim 9 wherein said material comprises maleic anhydride.

11. A reaction product as set forth in claim 1 wherein said material comprises a carboxylic acid.

12. A reaction product as set forth in claim 11 wherein said material comprises fumaric acid.

13. A reaction product of sulphur-vulcanized hydrocarbon rubbery polymer of a conjugated diene and between about 0.08 and about 0.51 mol, per 100 grams of rubber hydrocarbon, of maleic anhydride.

14. A reaction product of sulphur-vulcanized hydrocarbon rubbery polymer of a conjugated diene and approximately 0.32 mol, per 100 grams of rubber hydrocarbon, of maleic anhydride.

References Cited in the file of this patent

UNITED STATES PATENTS

| | | |
|---|---|---|
| 1,249,181 | Ostromislensky | Dec. 4, 1917 |
| 2,069,151 | Ioannu | Jan. 26, 1937 |
| 2,343,558 | Kirby et al. | Mar. 7, 1944 |
| 2,386,707 | Moore et al. | Oct. 9, 1945 |
| 2,461,192 | Banbury et al. | Feb. 8, 1949 |
| 2,626,248 | Brown | Jan. 20, 1953 |
| 2,653,915 | Elgin et al. | Sept. 29, 1953 |
| 2,653,916 | Elgin et al. | Sept. 29, 1953 |

OTHER REFERENCES

"Rubber Age," Fuhrmann et al., November 1948, pages 201–204.

UNITED STATES PATENT OFFICE
CERTIFICATE OF CORRECTION

Patent No. 2,879,245                              March 24, 1959

Joseph Green

It is hereby certified that error appears in the printed specification of the above numbered patent requiring correction and that the said Letters Patent should read as corrected below.

Column 7, line 68, for "1.229" read -- 1.269 --; column 20, line 37, before "parts of maleic" insert -- 4 --; column 24, line 30, after "peroxide" strike out "of".

Signed and sealed this 14th day of July 1959.

(SEAL)

Attest:

KARL H. AXLINE                              ROBERT C. WATSON

Attesting Officer                           Commissioner of Patents